(12) United States Patent
Lippert et al.

(10) Patent No.: US 7,165,719 B2
(45) Date of Patent: Jan. 23, 2007

(54) METHOD FOR CONTROLLING A SERVICE-PROVIDING DEVICE

(75) Inventors: Johannes Lippert, St. Wolfgang (AT); Franz Hasewend, Hinterglemm (AT); Dirk Forke, Mainz (DE)

(73) Assignee: Skidata AG, Gartenau (AT)

( * ) Notice: Subject to any disclaimer, the term of this patent is extended or adjusted under 35 U.S.C. 154(b) by 0 days.

(21) Appl. No.: 10/478,592

(22) PCT Filed: May 7, 2002

(86) PCT No.: PCT/EP02/05028

§ 371 (c)(1),
(2), (4) Date: Sep. 7, 2004

(87) PCT Pub. No.: WO02/093507

PCT Pub. Date: Nov. 21, 2002

(65) Prior Publication Data

US 2005/0084107 A1    Apr. 21, 2005

(30) Foreign Application Priority Data

May 17, 2001   (DE) ............................ 101 24 156

(51) Int. Cl.
*G06K 5/00* (2006.01)
(52) U.S. Cl. ................................................ 235/380
(58) Field of Classification Search ............... 364/401; 382/115; 700/237; 235/380, 382, 382.5; 713/202
See application file for complete search history.

(56) References Cited

U.S. PATENT DOCUMENTS

| | | | |
|---|---|---|---|
| 3,624,608 A | | 11/1971 | Altman et al. |
| 4,999,763 A | | 3/1991 | Ousborne |
| 5,225,977 A | * | 7/1993 | Hooper et al. ............... 705/41 |
| 5,757,643 A | * | 5/1998 | Kuroda et al. ................ 700/9 |
| 6,167,327 A | * | 12/2000 | Broker et al. .............. 700/238 |
| 6,219,439 B1 | * | 4/2001 | Burger ....................... 382/115 |
| 6,367,653 B1 | * | 4/2002 | Ruskin et al. ................ 221/1 |

(Continued)

FOREIGN PATENT DOCUMENTS

DE    25 48 343    5/1977

(Continued)

OTHER PUBLICATIONS

International Search Report mailed Nov. 19, 2002 in PCT International Application No. PCT/EP02/05028 (6 pages).

(Continued)

*Primary Examiner*—Karl D. Frech
*Assistant Examiner*—Tae W. Kim
(74) *Attorney, Agent, or Firm*—Flynn, Thiel, Boutell & Tanis, P.C.

(57) ABSTRACT

For controlling the use of a device (1) performing a service, the authorized persons are issued contactless data carriers (2) that, upon use of the device (1), communicate with a reader (3) storing the personal authorization data in a memory (4). If authorization is ascertained, the reader (3) enables the device (1). The service performed by the device (1) is stored in the memory (4). The particular person's transaction data stored in the memory (4) are read by a control person with a portable reader (5) and transferred to a data center (10) with a terminal (8) by telecommunication.

7 Claims, 1 Drawing Sheet

U.S. PATENT DOCUMENTS 6,862,496 B2 * 3/2005 Fukuoka et al. ............ 700/237

FOREIGN PATENT DOCUMENTS

| DE | 31 13946 | 10/1982 |
|----|----------|---------|
| DE | 3401 319 | 7/1985 |
| DE | 41 11 192 | 10/1992 |
| DE | 196 24 762 | 1/1998 |
| EP | 0 505 137 | 9/1992 |
| WO | WO 85/02701 | 6/1985 |
| WO | WO 97/49576 | 12/1997 |
| WO | WO 00/52655 | 9/2000 |

OTHER PUBLICATIONS

Search Report dated Jan. 28, 2002 in German Application No. 101 24 156.9 (3 pages).

* cited by examiner

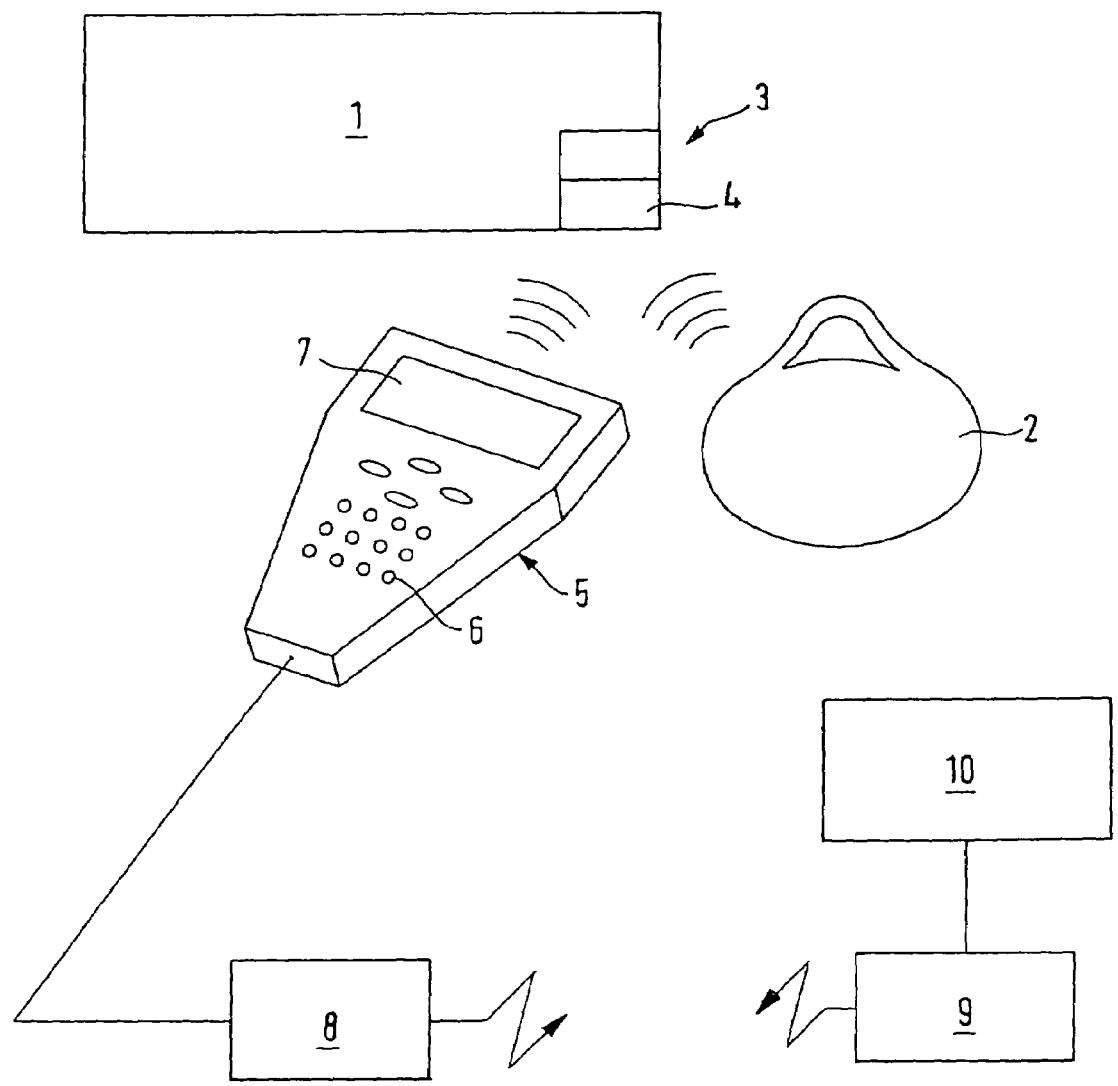

METHOD FOR CONTROLLING A SERVICE-PROVIDING DEVICE

This invention relates to a method for controlling the use of a device performing a service according to the generic part of claim 1.

Such a device can be for example a jointly used device such as a washing machine for the tenants of an apartment house or similar community.

Washing machines of such communities are usually operated by insertion of coins nowadays. Besides the awkward handling, coin machines are for example susceptible to vandalism, in danger of burglary, and sometimes irregularities occur during emptying. Moreover, the usually powerful, costly coin washing machines are sometimes used illegally by strangers who partly even operate commercially.

In addition, the use of a washing machine or similar jointly used device performing a certain service must be regularized in an apartment building for example. That is, a schedule is set up for example to lay down when a certain member of the community may use a service device and when he may not. Such rules are difficult to monitor with a coin machine and are therefore frequently disregarded.

A method according to the generic part of claim 1 with a chip card as a data carrier is known for example from DE 4111192A1 for controlling the use of telephone apparatuses connected to a private branch exchange for example in hotels, and moreover from DE 19624762A1 for controlling the use of a radio receiver with a telephone card as a data carrier.

The problem of the invention is to provide a method for substantially improving and simplifying the control of the use of a device performing a service.

This is obtained according to the invention with the method characterized in claim 1. The subclaims render advantageous embodiments of the invention.

The invention is intended for controlling the use of service devices that are at the disposal of a group of persons. These persons are issued the contactless data carriers with the personal data stored thereon. Said group of persons can be for example the occupants of an apartment building who have the service devices at their disposal as jointly used devices.

The device performing a certain service can be for example a washing machine or other power consumer, such as a vacuum cleaner, for which the extent of utilization is determined and optionally billed according to power consumption. However, the service device can for example also be a pay TV set or an access control device for example for a sauna, fitness room or swimming pool or the like.

The contactless data carrier that is issued to the authorized persons is in particular an RFID transponder with a chip and antenna, which can be integrated for example into a key pendant, a card e.g. in check card format, or the like.

The reader communicating with the contactless data carrier is preferably disposed on or in the area of the service device. The reader can also be formed as a read/write device.

The control person who reads the particular person's transaction data stored in the memory of the reader with the portable reader preferably formed as a hand-held reader can be e.g. the caretaker in an apartment building.

The data center can be formed for example by a server that stores a program for managing the data of the authorized persons. The telecommunication from the terminal, by which the data read by the control person's portable reader are transferred to the data center, can be effected over the telephone network, the terminal thus having a modem for example.

The authorized persons' data stored in the data center are for example the particular person's name and address, his credit card number or banking connection and/or the data of the particular device or devices that the person is authorized to use, and/or the data on the time periods of use.

The data carrier with the authorization data stored thereon is given to the person, for example sent or handed over by the caretaker or at an issuing office.

The authorization data comprise the data of the particular service device or devices that the relevant person is authorized to use, the data for identifying the person and for example the time data that lay down when the particular service device can be used by the relevant person. The authorization data can also be transferred from the data center by telecommunication via the terminal onto the portable reader, which is formed for this purpose as a read/write device.

The memory of the reader of the particular service device, for example a washing machine, stores the personal authorization data, i.e. the personal identification data and for example the abovementioned time data. Storage of the personal authorization data in the memory of the reader of the service device can be effected for example by the control person, who receives the authorization data transferred by telecommunication from the data center via the terminal to the portable reader.

When the particular person wants to utilize the service, he uses his data carrier to enter into communication with the reader of the service device. If there is a match between the authorization data read from the data carrier and the authorization data stored in the memory of the service device reader, i.e. if authorization is ascertained, the reader enables the service device so that the service can be performed. The transaction, i.e. the utilization of the service and optionally its duration and extent, i.e. for example the power consumption, e.g. of a washing machine, is stored in the memory of the service device reader.

At certain time intervals, for example weekly, monthly or quarterly, the control person downloads the data of the individual persons' total transactions and optionally their duration and extent onto the portable reader and then transfers these data via the terminal by telecommunication to the data center, which at the same time performs the billing and optionally collects the corresponding amount for example from the relevant person's bank account.

It is thus possible to economize on the total billing effort and overhead for a service device, for example a washing machine, to be utilized by several persons, for example occupants of an apartment building.

At the same time the control person can use the portable read/write device to delete or invalidate a person's authorization data in the memory of the service device reader and thereby withdraw his authorization to use the service device.

The portable reader preferably has a display and a keyboard for menu navigation, for example for downloading transaction data from the service device reader, for a functional check of the authorized person's data carrier or for transferring data from the portable reader to the data center.

In the following the invention will be explained in more detail with reference to the drawing, whose single FIGURE schematically shows an embodiment of the inventive method.

The drawing illustrates a system for controlling the use of one or more service devices that are at the disposal of a group of persons.

Thus, for controlling the use of service device 1, for example a washing machine, contactless-type RFID data carriers 2 for example in the form of key pendants are issued to the persons of a group, for example the occupants of an apartment building, who have service device 1 at their disposal. Each data carrier 2 stores the authorized person's data.

Service device 1 has reader 3 storing the authorized person's data in memory 4. Device 1 can be a washing machine with an electricity meter.

Upon use of service device 1 the person uses data carrier 2 to enter into communication with reader 3. If there is a match between the personal authorization data on data carrier 2 and the personal authorization data stored in memory 4, i.e. if authorization is ascertained, reader 3 enables or turns on service device 1, for example the washing machine.

The transaction data, i.e. the data on the particular use of the service device, for example the power consumption of the washing machine, are stored in memory 4 of reader 3.

At certain time intervals, for example monthly, the control person downloads the transaction data stored in memory 4 for the individual persons, for example the occupants of an apartment building, onto portable or hand-held reader 5 provided with keyboard 6 and display 7 for menu navigation. The downloaded transaction data are then transferred from hand-held reader 5 via terminal 8, for example with a modem, by telecommunication 9 to data center 10 in order to bill the particular person's use of service device 1.

The invention claimed is:

1. A method for controlling the use of a device performing a service, the method comprising issuing the persons authorized to use the device contactless data carriers that, upon use of the device, communicate with a reader storing personal authorization data in a memory contained within the reader, and enabling the device if authorization is ascertained, characterized in that the reader stores the service performed by the device in the memory, the particular person's transaction data stored in the memory being read by a control person with a portable reader and transferred with a terminal by telecommunication to a data center.

2. A method according to claim 1, characterized in that the billing of the performed service is effected by the data center on the basis of the data transferred with the portable reader.

3. A method according to claim 1, characterized in that the personal authorization data stored in the data center are read by the control person with the portable reader on the terminal and stored in the memory of the reader of the device.

4. A method according to claim 1, characterized in that the device is a device used by a community or similar group of persons.

5. A method according to claim 1, characterized in that the device is an electric power consumer and the billing of the performed service is effected according to the power consumption of the device.

6. A method according to claim 5, characterized in that the electric power consumer is a washing machine.

7. A method for controlling the use of a device performing a service, comprising the steps of:

issuing to a person authorized to use the device a contactless data carrier on which is stored data identifying the person;

storing personal authorization data in a memory contained within a data carrier reader associated with the device;

establishing communication between the contactless data carrier and the device data carrier reader when the authorized person desires to use the device;

enabling the device for use by the authorized person if authorization is ascertained by the device data carrier reader;

storing transaction data identifying the authorized person and a service performed by the device in the memory of the device data carrier reader;

providing a control person with a portable reader;

the control person using the portable reader to retrieve stored transaction data from the memory of the device data carrier reader; and connecting the portable reader to a communications terminal and transferring the retrieved transaction data to a data center.

* * * * *